April 11, 1939. E. B. MALLORY 2,154,132
PROCESS OF CONTROLLING THE PURIFICATION OF SEWAGE
Filed May 28, 1936 3 Sheets-Sheet 1
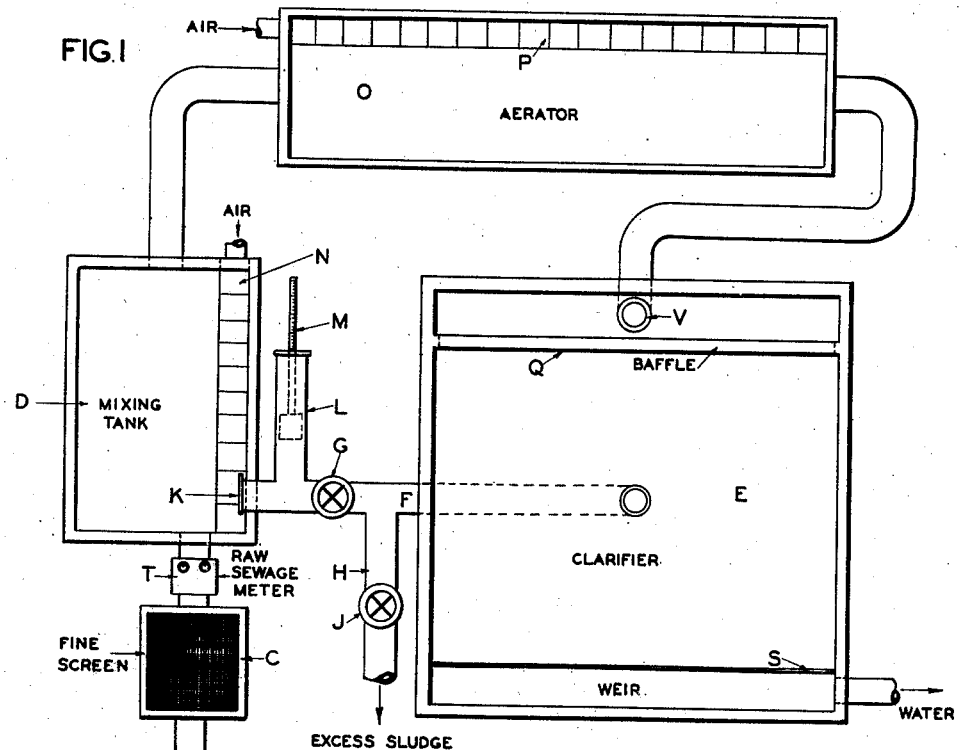
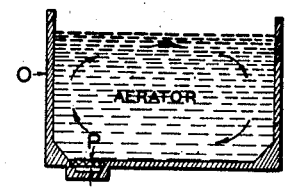
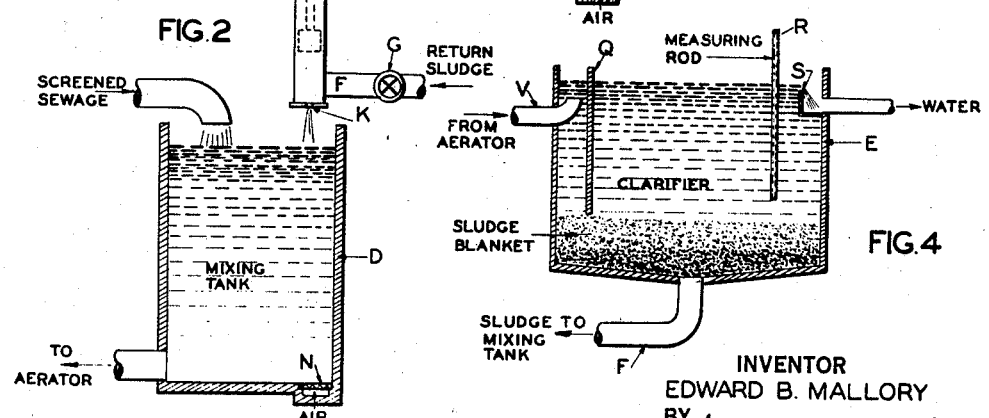
INVENTOR
EDWARD B. MALLORY
BY
ATTORNEYS

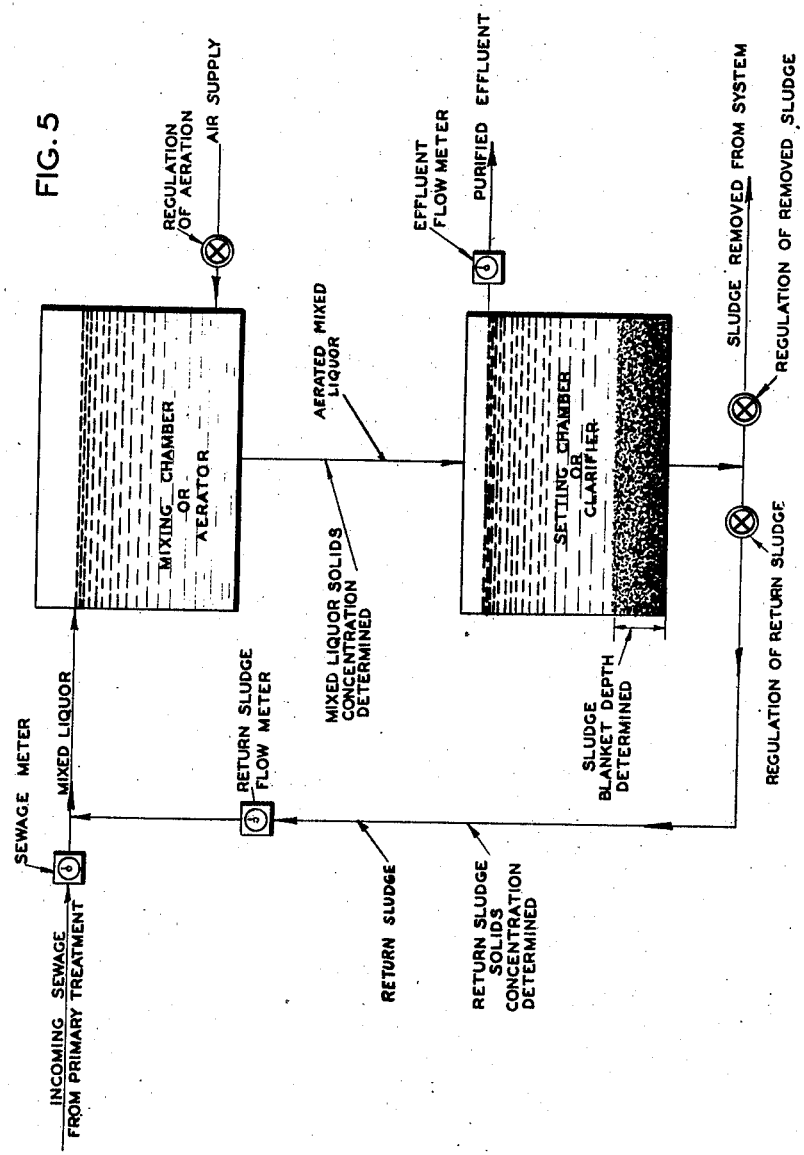

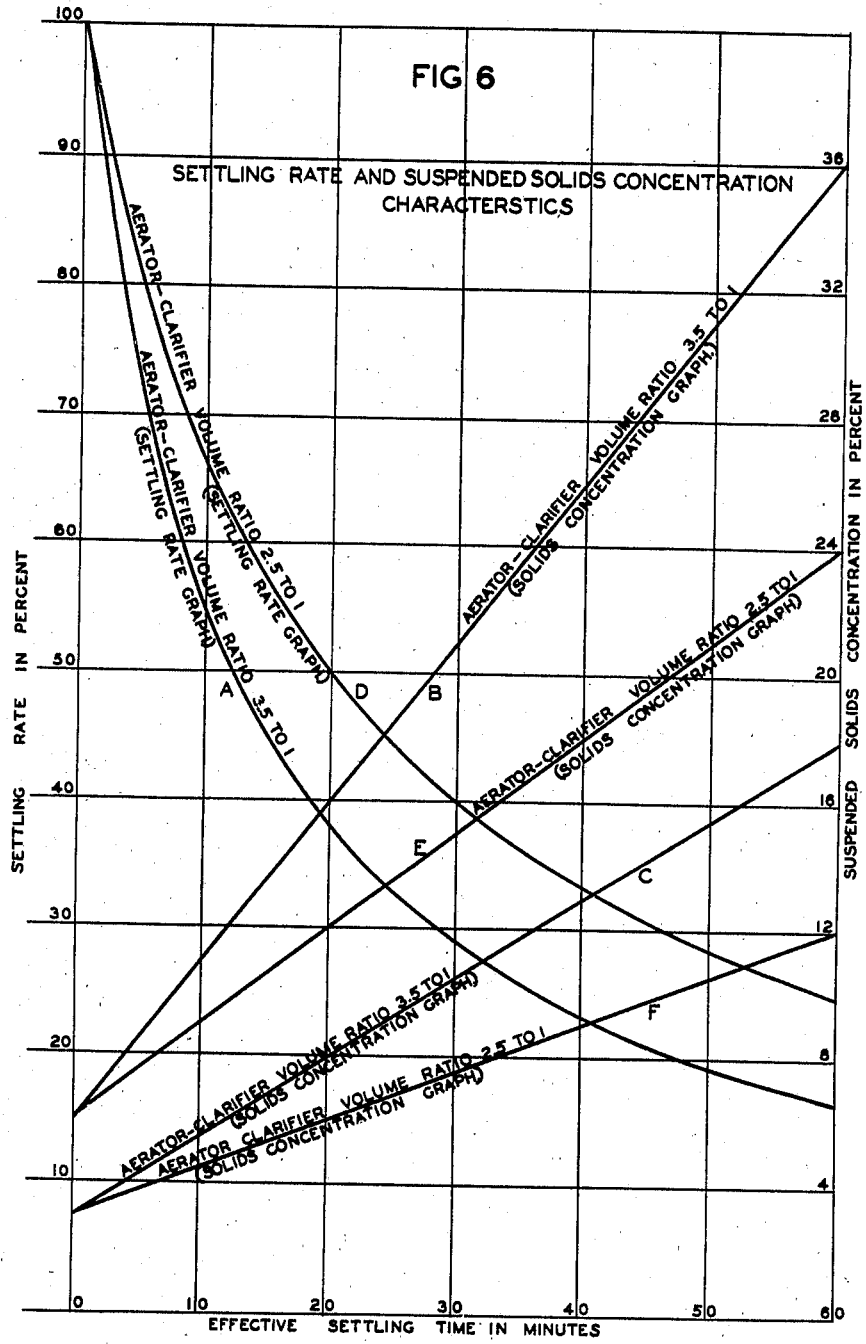

Patented Apr. 11, 1939

2,154,132

UNITED STATES PATENT OFFICE 2,154,132

PROCESS OF CONTROLLING THE PURIFICATION OF SEWAGE

Edward B. Mallory, Tenafly, N. J.

Application May 28, 1936, Serial No. 82,164

17 Claims. (Cl. 210—8)

Sewage purification processes are known wherein the incoming sewage, usually after preliminary screening and/or settling operations, is mixed with a sludge consisting of settled solid material precipitated from previously aerated sewage, to form a mixed liquor. This mixed liquor is aerated in one or more mixing chambers or aerators, after which the mixed liquor passes to one or more clarifiers or settling chambers at the bottom of which the suspended solids settle to form a sludge blanket, and the supernatant liquor or purified effluent passes off from the upper portion of the settling chamber and is discharged to the receiving waters of the region. Part of the sludge from the above mentioned sludge blanket (hereinafter called returned sludge) is recirculated back into the system to mix with the incoming sewage and form mixed liquor to be aerated, and excess quantities of sludge (hereinafter called excess or removed sludge) are withdrawn from the system, continuously or from time to time as required. Aerators and clarifiers so associated in a purification cycle are generally referred to as "secondary treatment" to distinguish this cycle from the preliminary screening or settling of raw sewage, or other forms of socalled "primary treatment."

It has been considered that processes of the above character are dependent upon the action of aerobic (air requiring) bacteria or other similar forms of germ life, and that successful operation requires the cultivation of the bacteria in such quantity and condition that purification of the sewage will be effectively and rapidly accomplished. This "activated" condition has been thought to be promoted by bringing the bacteria or other micro-organisms in contact with air during the aerating step.

In practical operation it has been found exceedingly difficult to maintain conditions of operation which will insure an effluent containing suspended solid and liquid impurities sufficiently small in amount to avoid pollution to receiving waters and to comply with public health requirements. The cost of operation also has been considerably higher than necessary. A dependable method of control probably has failed to appear because of the many difficulties facing anyone who endeavors to prescribe a control involving numerous kinds of bacteria operating on different kinds of solid material for varying intervals and with varying concentrations of raw sewage and amounts of sludge returned for recirculation therewith.

The principal object of the present invention accordingly is to provide a method of controlling a sewage purification cycle utilizing process steps of the above character, which will enable a satisfactorily clarified and purified effluent to be reliably maintained, and with reasonable and economical costs of operation.

Prior to my invention, in so far as I am aware, it has not been found possible under conditions approaching the full load capacity of the plant, to obtain consistently a high degree of purification, or to eliminate the occurrence of "bulking" (as hereinafter referred to). This meant that substantial amounts of the impurities originally contained in the raw sewage were discharged into the receiving waters of the region. The performance of the process has therefore been exceedingly erratic and irregular, and the operating costs have been unduly high. Moreover, on account of the lack of efficient control methods, some plants have not been operated up to their actual full load capacity, since bulking or other difficulties occurred before a full load operating condition was reached, and under these conditions raw sewage has been by-passed around the aerator and settling chambers directly into the receiving waters of the region. Pollution of receiving waters thus caused has seldom if ever been taken into account in reports of operation.

Using the control methods set forth in the present specification, it has been found possible to eliminate bulking difficulties and to maintain the performance of the process, at the full load capacity of the plant, at such efficiency that the removal of suspended and dissolved impurities will average 96% or better, the effluent therefore containing less than 4% of the impurities originally contained in the raw sewage. The operating costs moreover may be substantially reduced.

This application contains certain subject matter in common with my prior application Serial Number 668,217, filed April 27, 1933 entitled "Oxidized sludge sewage treatment process."

In this specification the terms "aerator" and "mixing chamber" will be understood to be used interchangeably and to denote one or more main aerators, preliminary mixing chambers when used, and other channels or tanks wherein mixed liquor in the treatment cycle is aerated at substantially the same rate as in the main aerators. Similarly the terms "clarifier" and "settling chamber" shall be understood to be used interchangeably to denote one or more settling chambers (associated with aerators in the treatment cycle) wherein aerated mixed liquor is settled, a sludge blanket is formed by suspended solids precipitated from the mixed liquor, and sludge is withdrawn from the bottom for recirculation in aerators of the character above described. By "concentration of suspended solids" in the mixed liquor and sludge, as hereinafter referred to, I mean the proportion or relative amount of suspended solids contained therein as determined by suitable volumetric or weight tests or other comparable physical determinations. It should be further understood that ratios of concentrations of suspended solids in the mixed liquor and returned sludge as hereinafter referred to, are to be predicated upon tests by comparable means and test results expressed in comparable terms. The expression "settling rate" or "rate of settling" as used herein, means the volume of a given container occupied by the sludge which has settled in a given time, in proportion to the total volume of liquid and sludge in the container. The term "volume" used herein, in relation to aerators or clarifiers, will be understood to mean the volumetric liquid holding capacity of the aerator or clarifier. The term "load" as used herein will be understood to mean the amount of suspended and/or dissolved impurities contained in the raw sewage passing through the plant.

In the following specification taken in conjunction with the accompanying drawings, the aforesaid control process is disclosed as applied to an illustrative sewage purification plant (shown in the drawings in simplified and diagrammatic form) but it should be understood that such disclosure is merely illustrative of the principles of the invention and that the invention in its broader aspects is in no wise confined thereto.

In the drawings—

Fig. 1 is a diagrammatic plan view showing various tanks through which the sewage may pass during the purification treatment, and the connections between them.

Fig. 2 is a diagrammatic vertical sectional view of a mixing tank or preliminary aerator shown in Fig. 1.

Fig. 3 is a view similar to Fig. 2 but showing a main aerator or mixing chamber.

Fig. 4 is a diagrammatic vertical sectional view of a clarifier or settling chamber in which the sludge blanket is formed and from which settled sludge is withdrawn for recirculation in the system and additional quantities of sludge withdrawn for discard and disposal, and from which purified effluent is also withdrawn.

Fig. 5 is a schematic diagram illustrating the flow of the liquids through the various processing tanks.

Fig. 6 is a graphic illustration of settling rates and rates of increase of the concentration of suspended solids of settling sludge.

As shown in Fig. 1 the raw sewage may enter through pipe A and first pass through a suitable primary treatment, typified in the drawings by coarse and fine screens B and C. Liquids flow through this part of the system, and the other parts described below, by gravity or by pumping, as required. Coarse particles of sewage having been removed in the primary treatment, the raw sewage passes into the mixing tank or preliminary aerating chamber D, where it is mixed with the returned sludge which is recirculated into the system from the sludge blanket in the clarifier or settling chamber E, through the pipe F, in which valve G controls the amount of returned or recirculated sludge, and valve J in branch H controls the amount of excess sludge withdrawn from the system. Preliminary aerator or mixing chamber D is frequently omitted and the returned sludge is mixed with the sewage in the main aerator to form the mixed liquor.

In the illustrated form of apparatus, the mixed liquor consisting of raw sewage and returned sludge, is mixed and aerated in the mixing tank or preliminary aerator D by air passing through the porous plates N and bubbled up through the mixed liquor. The mixed liquor then passes to a main aerator O, where it is thoroughly mixed and aerated in suitable manner, as by air passing in through the porous plates P. After a period of aeration in mixing chamber O, the mixed liquor then passes to clarifier E, through duct V, preferably entering clarifier E behind a baffle Q. Due to the relatively quiescent conditions existing in clarifier E, the suspended solids in the mixed liquor settle to form a sludge blanket at the bottom of the clarifier, the clear and purified supernatant liquor passing out over weir S and thence to the receiving waters of the region. Quantities of sludge for recirculation in the system and additional quantities for removal from the system are withdrawn from the bottom of clarifier E through duct F.

In the usual form of treatment cycle of this character, it is customary to maintain a continuous flow through the aerators and clarifiers, therefore it will be evident that new quantities of mixed liquor are continuously flowing into the settling chamber, that quantities of purified effluent are continuously flowing out of the settling chamber, that quantities of settled sludge are being continuously removed from the settling chamber for recirculation in the system, and additional quantities of settled sludge are being removed from the system either continuously or from time to time.

In practical operation in processes of the above character it has been found over a period of many years that the performance of the process is irregular and undependable, frequently resulting in an effluent containing excessive amounts of impurities. For example, under certain conditions the process after a phase of reasonably satisfactory performance may be found to exhibit a condition in which the sludge particles become turgid and more buoyant, the sludge blanket greatly increases in volume up toward the surface of the liquid in the clarifier, and large volumes of sludge are swept out in the effluent. This phenomenon is known as "bulking" of the sludge. Under such conditions the effluent may be much more impure than the raw sewage since the sludge is made up of impurities which have accumulated in the system over relatively long periods of time. Under other conditions it has been found that the supernatant liquor in the clarifiers above the sludge blanket may contain relatively large quantities of very finely divided suspended particles generally known as "pin floc." These particles are of the same character as other suspended matter in the sewage and sludge and accordingly represent impurities. The clarification of the effluent is impaired as such "pin floc" creates a visibly turbid condition. Heretofore the causes of these phenomena have not been clearly defined and no dependable methods of avoiding them have appeared.

I have discovered that reliable control of the performance of the process depends vitally and essentially upon the relative volumes of the aerator and clarifier tanks and upon the maintenance therein of respective amounts and concentrations of suspended solids which are in proper relation to the ratio between the above mentioned tank volumes; also that the amount of aeration of the mixed liquor, and the total amount of suspended solids in the system must be regulated in relation to the aforesaid tank sizes, as hereinafter set forth in greater detail.

I have also discovered that the rate of settling of the suspended solids in the settling chamber must be likewise regulated and controlled in proper relation to the above mentioned tank volumes.

Process factors such as the concentrations of suspended solids, amounts of suspended solids, and settling rate, above mentioned, may be readily determined from time to time by test. I have found that variations therein reflect changes in the amounts of impurities contained in the incoming sewage. Hence regulation of the amount of sludge returned, amount of sludge removed, and amount of aeration, either singly or conjointly, may be made to adjust the process factors to approach their proper values and thus adjust the process to conform to the varying conditions of load and maintain it in balance at all times.

The best efficiency of operation, both from the standpoint of purification and economy, is obtained when the process is operating in a condition which is not far removed from the "bulking" state, and consequently it is highly important that the control methods employed be capable of promptly detecting and correcting deviations from such a balanced condition toward "bulking". A greater latitude is permissible in respect to deviations of operating conditions toward the state in which "pin floc" is produced, without serious impairment of the quality of the effluent. The ratios hereinafter referred to which relate to the above mentioned process factors, are at equality when the process is in balance or equilibrium in respect to relative operating conditions in the aerating and settling tanks as indicated by the process factors above mentioned, so that operation is substantially at highest efficiency both from the standpoint of purification and economy.

If the process has been operating in a balanced condition, and an increase in load occurs (which tends to unbalance the process toward the bulking condition), this will cause, and be indicated by, a decrease in the settling rate of the sludge; the concentration of suspended solids in the returned sludge will be lowered, and this in turn will result in a decrease in the concentration of suspended solids in the mixed liquor. To adjust the process back towards a balanced condition, the following adjustments may be made: increase the rate of returned sludge flow; increase the amount of aeration; and decrease the rate of sludge solids removal from the system; or either of the first two above steps may be taken alone or in conjunction with the others. In many plants, particularly those which are relatively small in capacity, there may be no direct adjustment of the aerating step, but the best economy will be obtained when all three steps are coordinately regulated.

The aerator volume in most plants is relatively large as compared to the settling chamber volume, but if relatively small aerator volume is involved (other operating conditions being equal) it will be necessary, in regulating by adjusting the amount of sludge returned for recirculation, to return relatively larger amounts of sludge to maintain balance between the aerating and settling steps of the process. Conversely, if a relatively large aerator volume is involved (other operating conditions being equal) it will be necessary to return relatively smaller amounts of sludge for recirculation, to maintain such balance.

In the operation of any given plant, if the concentration of suspended solids in the settling chamber is too low with respect to the concentration of suspended solids in the mixed liquor, as determined by the ratios hereinafter described in greater detail, the effluent will be insufficiently purified and the unbalanced condition of the process will tend to aggravate itself unless corrected, until bulking occurs as evidenced by the increased volume of the sludge blanket and the discharge of an exceedingly large amount of suspended solids with the effluent. Conversely the occurrence in the settling chamber of an abnormally high concentration of suspended solids as compared to the suspended solids concentration in the mixed liquor, as determined by the ratios hereinafter explained in greater detail, will result in costly and inefficient operation, and this unbalanced condition also tends to aggravate itself unless corrected, until "pin floc" passes out with and accordingly pollutes the effluent.

Under circumstances where a plant is operating under very light load (the load measured in terms of amount of impurities to be removed from the sewage in a given time rather than the volume of sewage which passes through the plant in a given time) careful regulation will not be so important from the standpoint of clarification of the effluent so long as "pin floc" does not appear therein, although material departures from a balanced condition in the cycle will entail increased costs of operation. These conditions of operation are frequently met with during the early hours of the day, in plants serving residential communities. In plants where experience has shown that sharp peaks in load are to be expected at certain hours of the day, the regulation may be deviated intentionally from a balanced condition, somewhat prior to such peak periods, toward a condition wherein the concentration of suspended solids in the settling chamber is higher than normal, thus to accommodate expected sharp peak loads without causing bulking or any undue amount of impurities in the effluent. Reference herein to regulating the conditions of operation to approach certain ratios as hereinafter specified, accordingly should be understood as permitting special adjustments or tolerances of the character hereinabove referred to.

I have found that when the purification steps are in balance or equilibrium for best purification of the effluent and efficiency of operation, the ratio between the concentration of the suspended solids in the returned sludge and the concentration of suspended solids in the mixed liquor passing to the settling chamber, is substantially equal to twice the ratio between the aerator and clarifier volumes, minus one. Accordingly, the process may be effectively regulated by adjusting the suspended solids concentrations from time to time, to approach the above mentioned equality in ratios. The right hand side of such an equation, being a constant for any given tank group, may be initially determined, and the ratio between the concentrations measured by tests from time to time, for comparison with the plant constant above mentioned. Accordingly, at any given load if the tests show for example that the concentration of suspended solids in the returned sludge is too low (or in other words, that the relative concentration of suspended solids in the mixed liquor is too high) the amount of sludge returned for recirculation may be increased until further tests show that the above ratios, and accordingly the purification steps of the cycle, are substantially in balance, within permissible tolerances as above referred to. Decrease in the amount of sludge returned, or increase in the amount of sludge solids removed, or decrease in the amount of aeration, will ultimately tend to decrease the above mentioned ratio between concentrations of suspended solids. Particularly in the case of small plants, an excess of air for aerating or oxidizing purposes may at all times be present, and control by direct regulation of the amount of aeration may not be utilized (although regulation of the amount of sludge returned will indirectly affect the amount or extent of aeration).

The relative concentration of the suspended solids in the returned sludge and in the mixed liquor may be regulated by increasing or decreasing the time during which the mixed liquor is aerated; by increasing or decreasing the amount of aeration; by increasing or decreasing the rate of returned sludge flow; or by increasing or decreasing the amount of suspended solids in either or both tanks. It may frequently be desirable to employ two or more of these regulating means simultaneously. The concentration of suspended solids in the returned sludge may be increased by increasing the rate of recirculation of returned sludge. This follows from the fact that the specific gravity of the particles of suspended solids forming the sludge increases in proportion to the degree of oxidation of such particles, and the degree of oxidation of such particles depends upon the amount of aeration to which they have been subjected. As one factor in the amount of aeration, it will be evident that the degree of oxidation will be increased every time a sludge particle is recirculated through the aerator,—accordingly the extent of oxidation of the particle will be proportional to the number of times the particle has passed through the aerator, the length of time it was subjected to aeration in the aerator at each period of recirculation, and the intensity of the aeration during each period of recirculation. Contrasted with the above, the degree of oxidation will vary inversely with the amount of load represented by the raw sewage associated with each sludge particle during its repeated trips through the aerator. Therefore the ratio of the concentration of the suspended solids in the returned sludge and in the mixed liquor may be increased by increasing the rate of recirculation of returned sludge, by increasing the period of aeration, by increasing the amount of aeration, by decreasing the amount of sludge solids removed from the system, or by decreasing the load on the process. As the factor of load on the process is not usually controlled, suitable adjustments of the other factors will require greater or lesser regulation in direct ratio to the amount of loading.

I have also found that when the purification steps are in balance or equilibrium for best purification of the effluent and efficiency of operation that the ratio between the amount of suspended solids in the mixing or aerating chamber (or chambers) and the amount of suspended solids in the settling chamber (or chambers) will also be equal to the plant constant above referred to, and appropriate adjustments may be made in accordance therewith. The amount of suspended solids in the aerating chamber (or chambers) may be readily computed, knowing the concentration of suspended solids in the aerated mixed liquor passing to the settling chamber, and the volume of the mixing or aerating chamber. The amount of suspended solids in the settling chamber may also be computed, knowing the dimensions and shape of the settling chamber and the depth of the sludge blanket (that is the distance between the top surface of the sludge blanket and the bottom of the settling chamber). Where the bottom of the settling chamber is not flat, as is usually the case, of course mean depth values should be used. From the above the volume of the sludge blanket may be determined. Under balanced conditions of operation as hereinafter described in greater detail, the rate of increase of concentration of suspended solids in the sludge settling to form the sludge blanket will proceed uniformly according to a straight line rate. At the bottom of the sludge blanket the concentration of suspended solids is equal to that of the returned sludge. The amount of suspended solids in the settling chamber accordingly will be equal to the mean between the suspended solids concentration of the mixed liquor and the returned sludge multiplied by the volume of the sludge blanket.

The amount of suspended solids in the aerator may be increased by increasing the rate of returned sludge flow, or by increasing the concentration of the suspended solids in the returned sludge without increasing the rate of returned sludge flow. The amount of sludge solids withdrawn from the system will also govern in a measure the amount of suspended solids in the aerator at a given rate of returned sludge flow, for example, withdrawing increased quantities of sludge through duct H as regulated by valve J will reduce the concentration of suspended solids in the returned sludge and therefore reduce the amount of suspended solids in the aerator. Similarly decreasing the amount of sludge solids withdrawn from the system through duct H will, at a given rate of returned sludge flow, increase the concentration of the suspended solids in the returned sludge and consequently the amount of suspended solids in the aerator.

I have also found that when the purification steps are in balance or equilibrium for best purification of the effluent and efficiency of operation that the ratio between the total volume of the settling chamber and the volume thereof which is occupied by the sludge blanket will be equal to the plant constant above referred to, and appropriate adjustments may be made in accordance therewith.

The volume of the sludge blanket may be reduced by increasing the rate of returned sludge flow or by increasing the amount of sludge withdrawn from the system. Conversely the volume of the sludge blanket may be increased by decreasing the rate of returned sludge flow or by decreasing the amount of sludge withdrawn from the system. The amount of aeration in the mixing chamber likewise indirectly affects the volume of the sludge blanket. As the amount of aeration increases, the oxidation of the suspended solids similarly increases with the consequent increase in the specific gravity of the suspended solids, with the result that the solids after reaching the clarifier settle more rapidly and form a more compact blanket.

From the fact that each of the above ratios are at equality with the plant constant when the process is in balance or equilibrium, it follows that they will then be similarly related to each other. For example, the ratio between the total settling chamber volume and the volume thereof occupied by the sludge blanket, will be equal at process equilibrium to the ratio between the concentration of suspended solids in the returned sludge and the concentration of suspended solids in the mixed liquor passing to the settling chamber. Under similar conditions both of these last mentioned ratios will be equal to the ratio between the amount of suspended solids in the mixing chamber and the amount of suspended solids in the settling chamber. Other comparisons may be made; at equilibrium the ratio between the mean concentration of suspended solids in the settling chamber and the concentration of suspended solids in the aerated mixed liquor, will be equal to the ratio between mixing or aerating chamber, and settling chamber, volumes.

As the various factors involved in the equations set forth in the last paragraph have been previously discussed, the regulation to bring the steps of the process into balance may be made in similar manner.

I have also discovered that when the aerating and settling steps of the process are in balance, the ratio between the rate of effluent flow (which is equal to the rate of inflow of the incoming sewage minus the rate of flow of excess sludge removed from the system), and the returned sludge flow (as determined by suitable measurement), will be equal to twice the aerator volume divided by the settling chamber volume, minus two. The right side of this equation is also a constant for any given tank group and may be initially determined and the ratio between the flow rates measured from time to time for comparison with this constant and operating conditions adjusted to approach an average condition wherein the ratio between the flow rates is equal to the constant. Accordingly flow rates may be compared on the basis of observations made from time to time, and operating conditions regulated or adjusted to approach a condition wherein the last mentioned ratio is at equality.

It is desirable in the operation of this type of process to maintain the rate of returned sludge flow in substantially uniform ratio to the raw sewage flow, and substantially in accordance with the equation last discussed. At times, however, as indicated in the description of adjustments relating to the equations previously discussed, it may be desirable to increase or decrease the rate of returned sludge flow for short periods. This will be particularly true during each diurnal period, during which period the fluctuations in loadings vary through a wide range, as the sewage flow similarly increases through a relatively wide range, and adequate compensation generaly is promoted by a returned sludge flow rate greater than above specified. However, with all other factors in balance, a corresponding decrease in the rate of returned sludge flow will be desirable in most plants during the late night or early morning hours, and over a period of a month or a year the average returned sludge flow rate should be maintained closely approximating the ratio specified in the last mentioned equation when the process is maintained substantially in balance.

I have also discovered that when the process is operating in balance, the rate of increase in concentration of the suspended solids of the mixed liquor which is settling and forming a sludge blanket in the clarifier is at an uniform and straight line rate according to the following equation:

$$r = \frac{2amt - 2cmt + 60cm}{60c}$$

wherein, $r$=concentration of the suspended solids in the returned sludge at any given time "$t$".
$a$=aerator volume in gallons.
$m$=concentration of the suspended solids in the mixed liquor.
$t$=effective sludge settling time or detention period, in minutes.
$c$=clarifier volume in gallons.

The effective sludge settling time "$t$" or detention period in the above equation may be determined in accordance with the equation:

$$t = \frac{60f}{f+k}\left(\frac{24c}{f+k}\right).666$$

wherein,
$f$=flow rate of clarifier effluent in gallons per day.
$k$=flow rate of returned sludge in gallons per day.
$c$=volumetric liquid holding capacity of the clarifier in gallons.

The time "$t$" is of course limited in extent by the tendency of sludge to become septic and swell. The length of time in which further settling may cease and swelling may commence varies directly with the degree of oxidation of the sludge particles. Poorly oxidized sludge may stop settling and start to swell in less than an hour, while well oxidized sludge may continue to settle for over an hour, and septicization and swelling may not occur for three to four hours or longer.

It is highly important that the rate of increase in concentration of suspended solids in the mixed liquor which settles to form a blanket in the clarifier, be maintained substantially in accordance with the above mentioned straight line rate. I have found that when the rate of increase in concentration of the suspended solids in settling sludge is substantially more rapid than as above set forth, the highly oxidized particles (which settle more rapidly than required to bring about this rate of concentration) settle so rapidly that particles of a lower degree of oxidation do not adhere to the more highly oxidized and heavier particles, and therefore do not agglomerate therewith and settle at the same rate. The result is that substantial quantities of these macroscopic, and microscopic colloidal particles and light flocs remain suspended in the supernatant liquor causing turbidity thereof. On account of the flow of the liquid component of the effluent over the weirs of the clarifier, quantities of these particles are carried along in this flow and discharged to the receiving water of the region. These light floc and colloidal particles largely represent unoxidized organic matter and other impurities, and consequently reduce the purity of the effluent in proportion to the amount of such particles which pass out with the effluent. It is highly important therefore that the settling rate of all suspended particles of solids, colloidal and otherwise, in the mixed liquor, be at a substantially uniform and appropriate rate in order that the supernatant liquor may be clear, and free of appreciable quantities of impurities. In a settling glass test in which settling of the sludge may be observed visually, it will be found that the supernatant liquor is turbid and contains more or less colloidal particles and straggler floc when the initial rate of increase of the concentration of suspended solids in the sludge blanket is substantially more rapid than above set forth. When this rate of concentration is reduced to a rate slower than above set forth, a clearing of the supernatant liquor beginning at the top will be observed, and if allowed to settle over an extended period of time, substantial portions of the straggler floc and colloids will ultimately settle and consolidate with the heavier particles in the sludge blanket. The time at which a clear supernatant liquor may be expected at the surface may be readily shown graphically by plotting the concentration of suspended solids in the settling sludge against time as later explained in connection with Fig. 6. It will be found that as long as the direction of such a graph is above and divergent from a straight line rate, as defined by the equation hereinabove stated, straggler floc and turbidity will be observed in the supernatant liquor. After the graph begins to converge toward the optimum straight line graph, an increasing volume of supernatant liquor clear of straggler floc and turbidity will be found.

Similarly, when the initial rate of increase of the concentration of the suspended solids in the settling sludge is slower than the straight line rate described hereinabove, the supernatant liquor will be clear and relatively free of colloidal particles and straggler floc, (except under conditions of substantial under-aeration and treatment). However, if the rate of increase of concentration of the suspended solids is consistently too low, bulking will be imminent, and the process may be regarded as in an unstable condition, wherein any sudden increase of flow or sewage strength may bring about sludge bulking in a short time unless appropriately restrained by suitable remedial measures. Such remedial measures will be indicated by the departures from balance of the ratios previously discussed.

Fig. 6 shows graphically, and for different ratios of aerator-clarifier volume, settling rates and rates of increase in concentration of suspended solids, which should obtain when the process is operating in balance or equilibrium, and toward which the operating conditions should be adjusted. In this graph the ordinate values at the left margin represent the settling rate in percent. When a sample is tested in a laboratory by a suitably graduated cylinder, the settling rate can be read directly from the graduations. When the test is made in a plant clarifier it is necessary to measure the mean depth of the sludge blanket and compute the ratio between this mean depth and the mean total depth of the clarifier occupied by the sludge and supernatant liquid, preferably expressing the result in percent. The ordinate values at the right of Fig. 6 indicate the concentration of the suspended solids in percent, the particular ordinate values selected being predicated upon tests somewhat similar to the centrifuge tests as hereinafter explained in greater detail. The abscissae values at the lower margin of the figure represent the effective settling time in minutes. As later explained in greater detail this effective settling time or detention period in the clarifier, may be determined by suitable test, or may be calculated with sufficient degree of accuracy for practical purposes, as hereinabove shown.

In graph A of Fig. 6 an aerator-clarifier ratio of 3.5 to 1 is assumed, and the graph shows the characteristic settling rate (in percent) of the sludge, plotted against time, as the solids settle in the clarifier. In one hour's time, as graph A shows, the sludge will have settled into a blanket occupying 16.6% of the volume of the clarifier. Graph B of Fig. 6 shows the rate of increase of the concentration of suspended solids (in percent) plotted against time, under conditions corresponding to those obtaining in graph A, and starting with a suspended solids concentration in the mixed liquor of 6%. As shown in graph B the suspended solids concentration increases regularly and uniformly until at the end of one hour it has increased to 36% or in accordance with the equation hereinabove stated.

Graph C of Fig. 6 illustrates the increase in suspended solids concentration which should obtain when the process is in balance under conditions similar to those above discussed in connection with graphs A and B except that the initial concentration of suspended solids in the mixed liquor entering the clarifier, is less than in the case of graph B, being, as indicated at the lower left hand end of graph C, 3%. As shown by the right hand end of graph C, the suspended solids concentration after one hour of effective settling time has increased to 18%, which rate of increase likewise agrees with the equation hereinabove stated. Comparison between graphs B and C indicates that for any initial concentration of suspended solids in the mixed liquor entering the clarifier, with a given tank ratio, the rate of increase in concentration of suspended solids should be the same.

Graphs D, E and F indicate the characteristic settling rate and corresponding suspended solids concentrations which obtain when the process is in balance, under conditions respectively similar to those involved in graphs A, B and C, except that the aerator-clarifier volume is in the ratio of 2.5 to 1. As shown by graph D the settling rate should be slower, the suspended solids at the end of an effective settling time of one hour, occupying 25% of the volume of the clarifier. And as shown by graph E, starting with a suspended solids concentration of 6% and with an aerator-clarifier volume ratio of 2.5 to 1, the suspended solids concentration after a one hour effective settling period should increase to 24%, instead of 36%, as was the case where the aerator-clarifier volume was 3.5 to 1. In other words, the rate of increase in suspended solids concentration in the clarifier should be slower in instances where the aerator-clarifier volume ratio is lower. Graph F compares similarly with graph C, showing that where the initial concentration of suspended solids in the mixed liquor entering the clarifier is 3% and the aerator-clarifier volume ratio 2.5 to 1 instead of 3.5 to 1, the concentration of suspended solids should likewise increase at a slower rate. At the end of a one hour effective settling time under the conditions considered in graph F, the concentration of the suspended solids has increased only to 12% instead of the value of 18% shown by graph C.

The graph A accordingly is common to the graphs B and C, and therefore may be regarded as showing the characteristic settling rate of the sludge in a plant having an aerator-clarifier volume ratio of 3.5 to 1, when the process steps are in balance. The graph D is similarly related to the graphs E and F and has the same significance in respect to a plant having an aerator-clarifier volume ratio of 2.5 to 1. The characteristic settling rate graph being constant for any given aerator-clarifier volume ratio, may be plotted initially and readily compared with graphs of settling rates determined by cylinder graduate tests from time to time, as hereinafter described. The graphs above mentioned which indicate the rate of increase in concentration of the settling suspended solids will be obliquely directed with respect to their ordinates, since such rate can be neither infinite nor zero under any of the conditions under discussion.

The settling rate of the suspended solids in mixed liquor settling in the clarifier, and consequently the rate of increase in the concentration of suspended solids in the settling sludge, may be determined with reasonable accuracy by testing a specimen of such mixed liquor in a laboratory cylinder graduate. Under such conditions the effective sludge settling time will be equal to the elapsed or observed time, and the observed volume of the sludge blanket formed in the graduate may be plotted at 5 or 10 minute intervals, and may be converted by computation into the corresponding values of concentration of the suspended solids in the blanket at such intervals, thereby to make up graphs similar to those contained in Fig. 6.

When mixed liquor having a given suspended solids concentration is allowed to settle in a laboratory cylinder graduate until the blanket formed by the settled suspended solids occupies one half of the total liquid volume in the graduate, the concentration of suspended solids in the blanket will be twice the original concentration of suspended solids in the mixed liquor. Likewise, if settling is continued until the blanket occupies only one fourth of the total liquid volume in the graduate the concentration of suspended solids in the blanket will be four times the original concentration of suspended solids in the mixed liquor. Accordingly, as the concentration of the suspended solids is inversely proportional to the volume of the blanket formed, the ratio between the concentration of suspended solids in the blanket and the concentration of the suspended solids in the mixed liquor before settling will be equal to the volume of liquid and sludge in the graduate divided by the volume of the sludge blanket.

In continuous flow clarifiers, as hereinabove shown, the suspended solids, settling to form the sludge blanket and the return sludge are continuously moving from the inlet to the outlet of the clarifier, therefore the sludge settling time, or effective detention period of the sludge solids, is the time during which such solids have been in the clarifier or the time required for the solids to pass from the inlet to the sludge outlet.

Accordingly, the concentration of suspended solids in the return sludge will vary in accordance with the effective settling time. This effective sludge settling time may be determined by testing a specimen of the mixed liquor passing from the aerator to the clarifier in a glass laboratory graduate as described and noting the time required to settle the suspended solids sufficiently to increase the concentration of the suspended solids in the sludge blanket settled in the graduate, to agree with the concentration of suspended solids in the returned sludge as determined by test.

When mixed liquor is settled in a laboratory graduate, there may be no visible evidence of settling during the first few minutes, so that readings then obtained if plotted may not then correspond strictly with a graph such as A or D, but as the settling time progresses the observed values will substantially coincide with such a graph, when the mixed liquor suspended solids are settling at the characteristic rate, hereinabove described. Solids concentration graphs may be made up therefore on the basis of such observations in a glass for comparison with graphs showing the characteristic straight line rate. When the rate of increase in concentration of the suspended solids exceeds that which would be obtained by the straight line equation previously discussed and as shown in Fig. 6, it is an indication of over-compensation, i. e. adjustment of operating conditions for a process load greater than needed. This may be corrected by reducing the amount of aeration, or reducing the amount of sludge returned for recirculation, or increasing the amount of sludge solids withdrawn from the system or appropriate combination of these adjustments as indicated by test to be needed. When the rate of increase in concentration of suspended solids is found to be less than according to the straight line equation above referred to, it is an indication of under compensation, i. e. adjustment of operating conditions for a load smaller than needed. This may be corrected by increasing the amount of aeration, increasing the amount of sludge returned for recirculation, or decreasing the amount of sludge solids removed from the system, or by appropriate combination of these adjustments.

In determining the concentrations of suspended solids, as involved in the ratios above discussed, representative specimens of the mixed liquor may be taken at any convenient point between the mixing chamber O and the clarifier E; similarly representative specimens of the returned sludge may be taken at any convenient point between the outlet in the bottom of the clarifier E and the point at which the returned sludge is mixed with the incoming sewage. An appropriate test of suspended solids concentration by weight or volume such as dry weight, centrifuge, photometric, photoelectric, turbidometer, or other convenient test method may be employed which will give a suitable measure of these concentrations for purposes of comparison.

It is frequently desirable to determine the concentrations of suspended solids quite quickly, because of rapid fluctuations in loading which occur in many plants during certain periods of the day, which fluctuations require prompt adjustment of operating conditions if the process is to be maintained substantially in balance. I have found that a suitable volumetric test of this character may be performed by employing an International Clinical Centrifuge (Catalog No. 416) having a full speed rate of about 2400 R. P. M. and using for example 15 ml. glass tubes which fit therein and are graduated in 100 equal divisions so that each division represents 1% of the total volume of the liquid specimen being tested. Centrifuging such a specimen of mixed liquor or returned sludge for a total of about 6,000 revolutions, a suitable and well defined reading of the percent of precipitated suspended solids by volume may be directly obtained. The percent of suspended solids determined in this manner may be used in connection with the ratios above discussed.

To determine the depth of the sludge blanket any suitable means may be employed, such as the pipe, closed at its lower end with clear glass, as shown at R in Fig. 1, which the operator may pass through the clear supernatant liquor as shown, until it reaches the top of the sludge blanket which may be observed through the pipe, suitable illumination being provided.

Regulation of the amount of sludge returned for recirculation and the amount of sludge removed from the system, may be readily accomplished by adjustment of the valves G and J (Fig. 1). Regulation of the amount of aeration is dependent upon a number of factors; for example, the length of time the mixed liquor is subjected to aeration; the amount of air supplied through porous plates as above described, or otherwise suitably brought into contact with the mixed liquor; the relative amount of returned sludge solids mixed with the sewage to form the mixed liquor; the amount of sludge solids in the system; and the amount of suspended and dissolved impurities in the incoming sewage.

In many plants using porous plates as above described, the mechanical air demand is greater than the process air demand; in other words, a substantial amount of air must be passed through diffusion media such as porous plates, to avoid fouling due to solids in the mixed liquor penetrating into the pores, and in plants where a relatively large area of porous plate diffusion media is present, the amount of air supplied cannot be reduced below the minimum demand required to avoid fouling, even though the process air demand may be less. In suitable designed plants, however, where the minimum mechanical air requirements are less than the minimum process requirements, the amount of aeration can be adjusted in accordance with the load on the process and operating conditions as indicated by the tests and ratios above described. In plants where the so-called mechanical agitation type of aeration is used, this will also be possible.

And in larger plants where spare aerator and clarifier tanks are available, the amount of aeration may be regulated by increasing or decreasing the number of tanks in service. Compensation for fluctuations in load rates may also be made by increasing or decreasing the number of aerators and clarifiers in service, spare tanks being put into service to accommodate increased loads, and taken out of service when the high load rate subsides. Adjustments of this character will modify the extent of regulation to be accomplished by adjustment of the various ratios above described.

The ratios above discussed take account of and compensate for changes in aerator-clarifier volume ratios, and hence are applicable generally to different plants, and altered tank ratios in a given plant.

I have found that the purification of sewage utilizing process steps of the character described, conforms to the principles of mass action and that the time of purification is inversely proportional to the intensity. In terms of sewage treatment, it may be found that the time during which the sewage is purified may be reduced by increasing the intensity of the reactions occurring. I have also found that a somewhat similar relationship exists between the period of aeration and the period of settling. For example, as the ratio of the aeration period to the settling period increases, the concentration of the suspended solids required in the mixed liquor decreases. I have also found that the suspended solids concentration of the mixed liquor and returned sludge and the amount of sludge solids in the system required to maintain balance of the process, will vary directly with the amount of load during each diurnal cycle. I have also found that when the process is operating at full load, and is in balance, the mixed liquor will settle and form a return sludge of optimum character and concentration of suspended solids, in a sludge settling period of about one hour, and such return sludge will have a suspended solids concentration by centrifuge test, as hereinabove described, of approximately 25.9% (equivalent by dry weight test to about 15,000 parts per million). Accordingly, concentrations of suspended solids in the mixed liquor and returned sludge, and an amount of aeration, sludge returned, and sludge removed, etc. consonant with the above settling period and suspended solids concentration of sludge, may be arrived at by the aid of regulating steps consonant with the equations above discussed.

I have found that when a process of this character is so operated that the process is in balance as indicated by equality of the equations hereinabove given, that the dissolved impurities in the sewage are suitably oxidized and converted to relatively stable forms and that the degree of purification of the effluent is higher than otherwise obtainable by treatment processes of the character described and therefore more desirable for discharge into receiving waters.

It will be readily understood that simple instructions and operating charts may be made up for any given aerator-clarifier volume ratio to assist operatives in quickly determining the condition of the process as indicated by the tests and ratios above discussed, and the regulating steps which should be taken from time to time.

While the invention has been described as carried out in connection with a specific sewage treatment apparatus and by the aid of certain specific tests applied to a specific sewage treatment cycle as above described, it should be understood that the invention in its broader aspects is not confined thereto. For example, I have also found that when the setting rate is increased by the addition of chemicals into the mixed liquor before aeration, such as ferric chloride, chlorinated copperas, ferrous sulphate, alum or other coagulating agents, which load or increase the weight of the sludge particles causing more rapid precipitation, that the proper balance is disturbed and that dissolved impurities, such as ammonia for example, are inadequately oxidized or converted to suitable stable compounds, also that substantial quantities of the colloidal particles in the sewage remain in suspension, as hereinabove described, thereby reducing the purification of the effluent. An uniform performance of a process employing sludge so loaded may be obtained however by the control methods disclosed herein, providing the ratios hereinabove given are modified to compensate for the rate of chemical dosage. This degree of compensation may be determined empirically and definite corrective factors of the ratios hereinabove given, corresponding to varying chemical dosages of various chemicals or combinations of chemicals may be established. Such determinations and employment of the principles hereinabove disclosed are within the purview of the invention in its broader aspects, within the scope of the appended claims.

I claim:

1. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above-mentioned system, determining the concentration of suspended solids in the returned sludge, determining the concentration of suspended solids in the aerated mixed liquor passing to the settling chamber, and maintaining the purity of the effluent by regulating said concentrations to approach a condition wherein the ratio between the concentration of the suspended solids in the returned sludge and the concentration of suspended solids in the mixed liquor passing to the settling chamber is substantially equivalent to twice the ratio between the volumetric liquid holding capacity of the mixing chamber and the volumetric liquid holding capacity of the settling chamber, minus one.

2. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the concentration of suspended solids in the returned sludge, determining the concentration of suspended solids in the aerated mixed liquor passing to the settling chamber, determining the depth of the sludge blanket, and maintaining the purity of the effluent by regulating said concentrations to approach a condition wherein the ratio between the amount of suspended solids in the mixing chamber and the amount of suspended solids in the settling chamber is substantially equivalent to twice the ratio between the volumetric liquid holding capacity of the mixing chamber and the volumetric liquid holding capacity of the settling chamber, minus one.

3. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the depth of the sludge blanket and maintaining the purity of the effluent by regulating said sludge blanket depth to approach a condition wherein the ratio between the volumetric liquid holding capacity of the settling chamber and the volume of the settling chamber occupied by the sludge blanket is substantially equivalent to twice the ratio between the volumetric liquid holding capacity of the mixing chamber and the volumetric liquid holding capacity of the settling chamber, minus one.

4. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the concentration of suspended solids in the return sludge, determining the concentration of suspended solids in the aerated mixed liquor passing to the settling chamber, determining the depth of the sludge blanket, and maintaining the purity of the effluent by regulating said concentrations to approach a condition wherein the ratio between the amount of suspended solids in the mixed liquor in the mixing chamber and the amount of suspended solids in the settled sludge is substantially equivalent to the ratio between the concentration of suspended solids in the returned sludge and the concentration of suspended solids in the mixed liquor passing to the settling chamber.

5. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the concentration of suspended solids in the returned sludge, determining the concentration of suspended solids in the aerated mixed liquor passing to the settling chamber, determining the depth of the sludge blanket, and maintaining the purity of the effluent by regulating said concentrations to approach a condition wherein the ratio between the volumetric liquid holding capacity of the settling chamber and the volume of the settling chamber occupied by the sludge blanket is substantially equivalent to the ratio between the amount of suspended solids in the mixing chamber and the amount of precipitated suspended solids in the settling chamber.

6. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the concentration of suspended solids in the returned sludge, determining the concentration of suspended solids in the aerated mixed liquor passing to the settling chamber, determining the depth of the sludge blanket, and maintaining the purity of the effluent by regulating said concentrations to approach a condition wherein the ratio between the volumetric liquid holding capacity of the settling chamber and the volume of the settling chamber occupied by the sludge blanket is substantially equivalent to the ratio between the concentration of suspended solids in the returned sludge and the concentration of suspended solids in the mixed liquor passing to the settling chamber.

7. The process of treating sewage which includes forming mixed liquor by mixing sewage from sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the rate of sewage flow, determining the rate of returned sludge flow, and maintaining the purity of the effluent by regulating the rate of returned sludge flow to approach a condition wherein the ratio between the rate of sewage flow and the rate of returned sludge flow is substantially equivalent to twice the ratio between the volumetric liquid holding capacity of the mixing chamber and the volumetric liquid holding capacity of the settling chamber, minus two.

8. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to precipitate the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the concentration of suspended solids in the returned sludge, determining the concentration of suspended solids in the aerated mixed liquor passing to the settling chamber, and maintaining the purity of the effluent by regulating said concentrations to approach a condition wherein the ratio between the mean concentration of suspended solids in the settling sludge in the settling chamber and the concentration of suspended solids in the mixed liquor is substantially equivalent to the ratio between the volumetric liquid holding capacity of the mixing chamber and the volumetric liquid holding capacity of the settling chamber.

9. The process of treating sewage which includes forming mixed liquor by mixing sewage with sludge consisting of settled solid matter precipitated from previously aerated sewage, aerating said mixed liquor in a mixing chamber, passing said mixed liquor into a settling chamber to increase the concentration of the suspended solids and form a sludge blanket thereof in such settling chamber, withdrawing purified effluent from said settling chamber, returning a portion of the precipitated sludge from a settling chamber to be mixed with incoming raw sewage thereby forming more mixed liquor which is aerated in the mixing chamber and passed to the settling chamber as described, removing another portion of the precipitated sludge from the above mentioned system, determining the rate of increase in concentration of the settling suspended solids, and maintaining the purity of the effluent by regulating the rate of the above mentioned increase in concentration to approach a condition wherein such rate substantially follows an obliquely directed straight line graph, substantially as set forth.

10. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the concentration of suspended solids in the withdrawn sludge, determining the concentration of suspended solids in the aerated mixed liquor passing to the settling chamber, and maintaining the purity of the effluent by regulating said concentrations to approach a condition wherein the ratio between the concentration of the suspended solids in the withdrawn sludge and the concentration of suspended solids in the mixed liquor passing to the settling chamber is substantially equivalent to twice the ratio between the volumetric liquid holding capacity of the mixing chamber and the volumetric liquid holding capacity of the settling chamber, minus one.

11. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the concentration of suspended solids in the withdrawn sludge, determining the concentration of suspended solids in the aerated mixed liquor passing to the settling chamber, determining the depth of the sludge blanket, and maintaining the purity of the effluent by regulating said concentrations to approach a condition wherein the ratio between the amount of suspended solids in the mixing chamber and the amount of suspended solids in the settling chamber is substantially equivalent to twice the ratio between the volumetric liquid holding capacity of the mixing chamber and the volumetric liquid holding capacity of the settling chamber, minus one.

12. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the depth of the sludge blanket and maintaining the purity of the effluent by regulating said sludge blanket depth to approach a condition wherein the ratio between the volumetric liquid holding capacity of the settling chamber and the volume of the settling chamber occupied by the sludge blanket is substantially equivalent to twice the ratio between the volumetric liquid holding capacity of the mixing chamber and the volumetric liquid holding capacity of the settling chamber, minus one.

13. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the concentration of suspended solids in the withdrawn sludge, determining the concentration of suspended solids in the aerated mixed liquor passing to the settling chamber, determining the depth of the sludge blanket, and maintaining the purity of the effluent by regulating said concentrations to approach a condition wherein the ratio between the amount of suspended solids in the mixed liquor in the mixing chamber and the amount of suspended solids in the settled sludge is substantially equivalent to the ratio between the concentration of suspended solids in the withdrawn sludge and the concentration of suspended solids in the mixed liquor passing to the settling chamber.

14. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the concentration of suspended solids in the withdrawn sludge, determining the concentration of suspended solids in the aerated mixed liquor passing to the settling chamber, determining the depth of the sludge blanket, and maintaining the purity of the effluent by regulating said concentrations to approach a condition wherein the ratio between the volumetric liquid holding capacity of the settling chamber and the volume of the settling chamber occupied by the sludge blanket is substantially equivalent to the ratio between the amount of suspended solids in the mixing chamber and the amount of precipitated suspended solids in the settling chamber.

15. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the concentration of suspended solids in the withdrawn sludge, determining the concentration of suspended solids in the aerated mixed liquor passing to the settling chamber, determining the depth of the sludge blanket, and maintaining the purity of the effluent by regulating said concentrations to approach a condition wherein the ratio between the volumetric liquid holding capacity of the settling chamber and the volume of the settling chamber occupied by the sludge blanket is substantially equivalent to the ratio between the concentration of suspended solids in the withdrawn sludge and the concentration of suspended solids in the mixed liquor passing to the settling chamber.

16. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to precipitate the suspended solids and form a sludge blanket thereof in such settling chamber, withdrawing purified effluent from said settling chamber, withdrawing precipitated sludge from said settling chamber, determining the concentration of suspended solids in the withdrawn sludge, determining the concentration of suspended solids in the aerated mixed liquor passing to the settling chamber, and maintaining the purity of the effluent by regulating said concentrations to approach a condition wherein the ratio between the mean concentration of suspended solids in the settling sludge in the settling chamber and the concentration of suspended solids in the mixed liquor is substantially equivalent to the ratio between the volumetric liquid holding capacity of the mixing chamber and the volumetric liquid holding capacity of the settling chamber.

17. The process of treating sewage which includes forming mixed liquor by mixing incoming sewage with sludge consisting of settled solid matter precipitated from previously aerated sewage, aerating said mixed liquor in a mixing chamber, passing said aerated mixed liquor into a settling chamber to increase the concentration of the suspended solids and form a sludge blanket thereof in such settling chamber, withdrawing purified effluent from said settling chamber, withdrawing precipitated sludge from said settling chamber, determining the rate of increase in concentration of the settling suspended solids, and maintaining the purity of the effluent by regulating the rate of the above mentioned increase in concentration to approach a condition wherein such rate substantially follows an obliquely directed straight line graph, substantially as set forth.

EDWARD B. MALLORY.